(12) United States Patent
Ieshima et al.

(10) Patent No.: US 6,854,646 B2
(45) Date of Patent: Feb. 15, 2005

(54) TRANSACTION MANAGEMENT SYSTEM AND METHOD

(75) Inventors: Takeshi Ieshima, Yokohama (JP); Yuuji Ide, Yokohama (JP); Takeshi Yokota, Hitachi (JP); Ken Nozaki, Machida (JP); Seiji Futatsugi, Kawasaki (JP); Masahiro Sakashita, Yokosuka (JP); Ryoji Satoh, Tokyo (JP); Masao Nishida, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/194,131

(22) Filed: Jul. 11, 2002

(65) Prior Publication Data

US 2003/0066880 A1 Apr. 10, 2003

(30) Foreign Application Priority Data

Oct. 5, 2001 (JP) ........................ 2001-310301

(51) Int. Cl.⁷ .......................... G06K 5/00; G06F 17/00; G06F 17/60
(52) U.S. Cl. ..................... 235/380; 235/375; 235/379; 705/39; 705/65
(58) Field of Search ............................ 235/375, 379, 235/380, 492; 705/35, 39, 65

(56) References Cited

U.S. PATENT DOCUMENTS 5,793,027 A * 8/1998 Baik .................... 235/380

| 6,189,787 | B1 | * | 2/2001 | Dorf | 235/380 |
|---|---|---|---|---|---|
| 6,315,195 | B1 | * | 11/2001 | Ramachandran | 235/380 |
| 6,443,362 | B1 | * | 9/2002 | Methlouthi | 235/487 |
| 2001/0014885 | A1 | * | 8/2001 | Yanagi | 705/65 |
| 2003/0061157 | A1 | * | 3/2003 | Hirka et al. | 705/39 |

FOREIGN PATENT DOCUMENTS

| JP | 07-210763 | 8/1995 |
|---|---|---|
| JP | 08-083309 | 3/1996 |

* cited by examiner

Primary Examiner—Karl D. Frech
Assistant Examiner—April Taylor
(74) Attorney, Agent, or Firm—Hogan & Hartson, LLP (57) ABSTRACT

A transaction processing method is provided for a transaction management system which processes transactions using settlement cards. In the transaction processing method, a transaction process is executed based on individual control information that is input at each transaction and transaction information for the transaction. A judgment is made based on the transaction information whether or not the transaction satisfies at least one count-up condition indicating a predetermined range of transaction types. When the transaction meets the count-up condition, numerical information indicative of the number of transactions satisfying the count-up conditions is added. A determination is made whether or not a numerical value represented by the numerical information after the addition is within a range specified by extraction conditions. Individual control information corresponding to the added numerical information determined to be within the range is extracted; and card holder information corresponding to the extracted individual control information is outputted.

16 Claims, 9 Drawing Sheets

| Use Date | Individual Control Number | Merchandise | Price | Member Store | |
|---|---|---|---|---|---|
| 2001.01.01.12:00 | 670188013 | Meals | 50000 | Z Hotel | 206 |
| 2001.02.03.12:00 | 670188013 | P Brand's bag | 50000 | A Department Store | 207 |
| 2001.05.01.12:00 | 670188015 | Trip to Hawaii | 70000 | A Department Store | 208 |
| 2001.06.03.12:00 | 670188013 | Ferry Ride | 200000 | S Travel Agency | 209 |
| : | : | : | : | : | |

Fig. 3

| Individual ControlNumber | Name | Credit Bal. | Birth Date | Password | Sex | |
|---|---|---|---|---|---|---|
| 670188013 | HITACHI TARO | 500000 | 1970.01.01 | 1234 | Male | 307 |
| 670188015 | HITACHI SABURO | 300000 | 1975.01.01 | 2345 | Male | 308 |
| : | : | : | : | : | : | |

Fig. 4

| Bit Range | 0~7 | 8~23 | 24~31 | 32~47 | 50~55 | 56~71 | .. |
|---|---|---|---|---|---|---|---|
| Allocated Area | Version Information of Area 1 | Numerical Information of Area 1 | Version Information of Area 2 | Numerical Information of Area 2 | Version Information of Area 3 | Numerical Information of Area 3 | .. |

Fig. 5

| Count Area # | Ver. | Compnay which designed conditions | Store in which Purchage Is made | Purchaced Merchandise | Count Lower Limit Amount | Effective Period | |
|---|---|---|---|---|---|---|---|
| 1 | 1 | A Department Store | Nihonbashi A Dept. Store | Brand Q's Product | 10000 | 2001.01.01-2001.06.30 | 508 |
| 1 | 2 | A Department Store | Nihonbashi A Dept. Store | Brand R's Product | 5000 | 2001.08.01-2001.09.30 | 509 |
| 2 | 1 | A Department Store | Osaka A Dept. Store | Brand Q's Product | 10000 | 2001.01.01-2001.06.30 | 510 |
| 3 | 1 | A Department Store | Fukuoka A Dept. Store | Brand Q's Product | 10000 | 2001.01.01-2001.06.30 | 511 |
| 4 | 1 | A Department Store | Nihonbashi A Dept. Store | Art Object | 20000 | 2001.04.01-2001.12.31 | 512 |
| 5 | 1 | A Department Store | Nihonbashi B Dept. Store | Art Object | 20000 | 2001.04.01-2001.12.31 | 513 |
| 6 | 1 | A Department Store | Ginza C Dept. Store | Art Object | 20000 | 2001.04.01-2001.12.31 | 514 |
| 7 | 1 | A Department Store | Abu Dabi X Hotel | Stay | 0 | 2001.01.01-2001.06.30 | 515 |
| 8 | 1 | A Department Store | Anchorage Y Hotel | Stay | 0 | 2001.03.01-2001.06.30 | 516 |
| 9 | 1 | A Department Store | Sofia Z Hotel | Stay | 0 | 2001.01.01-2001.05.31 | 517 |
| 9 | 2 | O Reserch Institute | * | Ferry Ride | 17000 | 2001.06.01-2003.05.31 | 518 |
| 10 | 1 | O Reserch Institute | * | Ferry Ride | 2000 | 2001.06.01-2003.05.31 | 519 |
| : | : | : | : | : | : | : | |

Columns: 501, 502, 503, 504, 505, 506, 507 — Table 108

Fig. 6

| Condition # | Member Store which sets up Conditions | Condition | Extraction Period | |
|---|---|---|---|---|
| 1 | A Department Store | [1]+[2]+[3]≧5 | 2001.01.01-2001.06.30 | 605 |
| 2 | A Department Store | [4]≧1 AND [5]≧1 AND [6]≧1 | 2001.04.01-2001.12.31 | 606 |
| 3 | A Department Store | [7]≧1 OR [8]≧1 OR [9]≧1 | 2001.03.01-2001.06.30 | 607 |
| 4 | P Shipping Agent | [9]≧3 | 2001.06.01-2003.05.31 | 608 |
| 5 | Q Travel Agent | [9]≧3 OR [10]≧30 | 2001.07.01-2002.06.30 | 609 |
| ⋮ | ⋮ | ⋮ | ⋮ | |

```
                                                    800
┌─────────────────────────────────────────────┐
│  Notice  From: C Credit   To: A Dept. Store │
├─────────────────────────────────────────────┤
│  P Shipping Agent                           │
│  Transmitted herewith is Customer Information│
│  that matches Condition "Code 4" of this    │
│  Agreement.                                 │
│                                             │
│  Matched Date: 2001.06.12.00                │
│  Customer Code: 670188013                   │
│  Customer Name: Mr. HITACHI, TARO           │
└─────────────────────────────────────────────┘
```

Fig. 9

| Customer Code | #1 | #2 | #3 | #4 | #5 | #6 | #7 | #8 | #9 | #10 |
|---|---|---|---|---|---|---|---|---|---|---|
| 670188013 | 2 | 0 | 0 | 2 | 0 | 0 | 0 | 0 | 0 | .. |
| 670188014 | 2 | 1 | 3 | 0 | 0 | 0 | 0 | 0 | 0 | .. |
| 670188015 | 0 | 0 | 0 | 0 | 0 | 1 | 0 | 1 | 0 | .. |
| : | | | | | | | | | | |

TRANSACTION MANAGEMENT SYSTEM AND METHOD

BACKGROUND OF THE INVENTION

1. Field of the Invention

The present invention relates to the use of customer information in the electronic settlement by credit cards and the like.

2. Description of Related Art

Electronic (paperless) settlements such as credit cards and ATM cards are commonly used. Such settlement requires the use of credit cards held by customers, or recipients of the service, and is carried out in the following manner:

First, a store clerk working at a member store inputs the code and price of merchandises purchased by customers into a card-processing device often located next to a cash register. Next, he slides the credit card through the device and inquires banks or credit card companies through their processing systems connected to the card-processing device to determine if such purchase can be authorized. Each credit card has a magnetic area or an IC memory device, which maintains the customer information such as a control number used by a credit card company and a customer name, or a bank account number.

Credit card companies or banks have processing systems that determine if the customer will be able to pay for the purchase. Based on this determination, if the systems authorize, the customer can receive the goods with his signature or the like. Also, a server of the processing systems maintains specific data necessary to withdraw fund from the customer's bank account.

When such electronic settlements are performed, member stores may want to research consumer purchasing trends through credit card companies since those credit card companies store information such as the purchaser's names, and the purchased items, places and amounts.

For instance, by analyzing data stored in the database, member stores can obtain information such as what merchandise was purchased, where it was purchased, and who made the purchase through observing the merchandise type by customer age group, the total purchase number per location, and the total purchase amount.

To achieve this, the following "data-warehouse building" method can be used:

1. After each business day, one can access to the customer information database, calculate the number of purchases and the purchase amount sorted by a "viewpoint" of analyses (i.e., merchandise, place and date of purchase, purchaser), and store the information in the database.

2. Furthermore, using the information stored in the database, one can perform more focused analyses (i.e., by manufacturer, purchased area, purchased month, and age and gender of the purchaser) and generate reports for the results.

Although basic information tables (generally, use details) in the server also enable comparable analyses, the aforementioned data-warehouse analyses are used because renewing basic information tables such as use details will be a significant burden for direct analyses thereof, particularly during business hours, as such renewal is performed often and the population of data used for analyses has a large volume.

Building a data warehouse secures data that are specific to the analyses and independent from the daily operations. However, as mentioned below, in the credit card industry, this method has some difficulties and has not been implemented. Also, as disclosing customer information to member stores could potentially create problems under the current laws, the open data-warehouse service is currently not provided.

To perform customer analyses using a data warehouse, one needs to accumulate data extracted according to the certain predetermined "viewpoints" and builds a database (data warehouse) sorted by each "viewpoint." Accordingly, when card service member stores and other operators perform purchase analyses using a database of credit card companies, credit card companies must search their database by each requested "viewpoint."

However, relatively small database aside, performing analyses using a large database typically owned by credit card companies has presented a challenge as it requires a significant burden to extract necessary information out of all data stored and sorted by each "viewpoint" in the database and to build a data warehouse in conjunction with daily operations.

SUMMARY OF THE INVENTION

The present invention relates to a transaction management method and system that collects data suitable for the viewpoints during transactions.

In accordance with an embodiment of the present invention, a transaction processing method is provided for a transaction management system which processes transactions using settlement cards each containing an individual control number for identifying a card holder. In the transaction processing method, a predetermined transaction process is executed based on individual control information that is input at the transaction and transaction information for the transaction; a judgment is made based on the transaction information whether or not the transaction satisfies at least one count-up condition indicating a predetermined range of transaction types; when the transaction meets the at least one count-up condition, numerical information indicative of the number of transactions satisfying the count-up conditions is added; a determination is made whether or not a numerical value represented by the numerical information after the addition is within a range specified by extraction conditions specifying a predetermined range of numerical values; and an individual control number corresponding to the added numerical information determined to be within the range is extracted, and card holder information corresponding to the extracted individual control number is outputted.

Memory areas storing numerical information can be set up within a server of credit card companies, otherwise can be set up with operators (i.e., in a card-processing device) or in memory devices (IC memories) located in cards held by customers For instance, by recording the total in a card held by a customer, the number of particular purchases made by that customer can be captured by simply reading the card (without accessing to credit card companies' server), which illustrates benefits of setting up a memory in various locations.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

The following illustrates an embodiment example of the present invention. In this example, settlements are performed using credit cards. Customers carry credit cards each containing an IC chip, and use the cards for settlement during transactions. The settlement method using ATM cards issued by banks are the same by replacing the credit cards used in this example with ATM cards containing IC chips, and credit card companies with banks.

To briefly outline an example of how this invention is used, recipients of this service of the present invention, such as operators including card member stores (simply referred to "operators") submit in advance, to credit card companies, "viewpoints" used in analyses of customer data held by credit card companies as conditions. These conditions are roughly classified into two categories: count-up conditions and extraction conditions. For example, the count-up conditions indicate predetermined transaction classifications, and the extraction conditions indicate the number of the aforementioned transactions that have been performed.

A credit card company determines, for each transaction, if a particular transaction meets any of the transaction classifications included in the count-up conditions. If the transaction meets the transaction classifications, the credit card company then adds such transaction to the numerical information in a count-area that is prepared for each customer. If the accumulated numerical information exceed the number of the transactions, information pertinent to that customer will be extracted.

Figure 1:
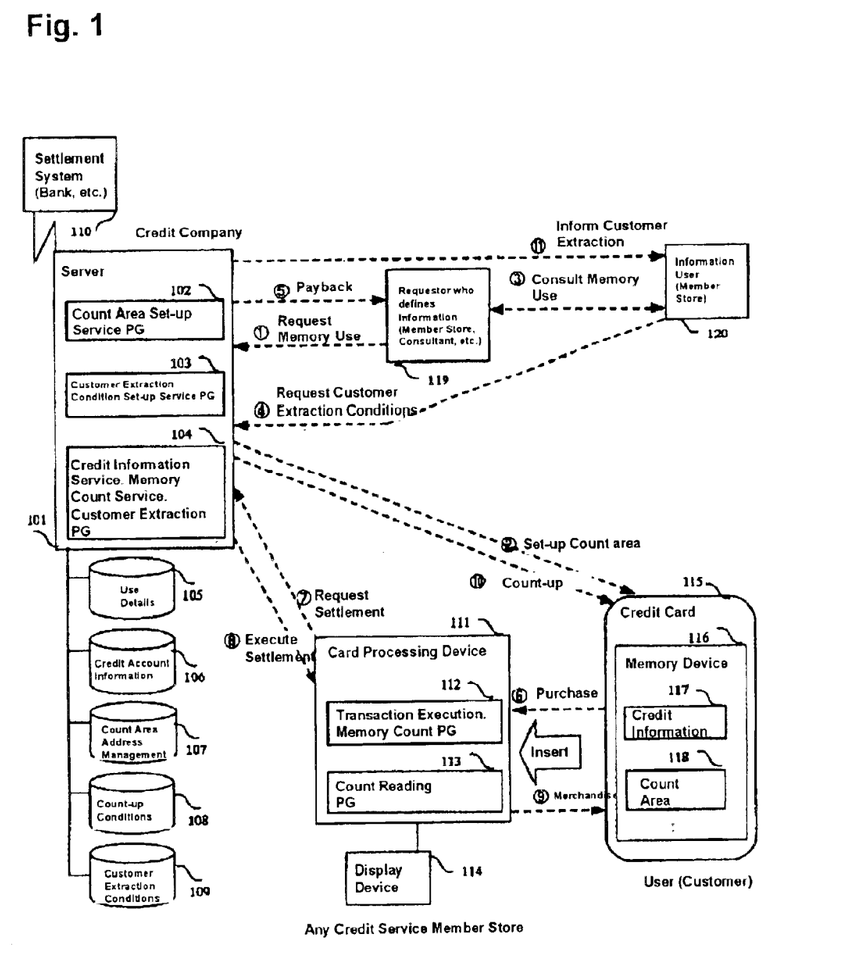
FIG. 1 shows an overall structure of a transaction management system.

One embodiment of the present invention will be described with reference to the accompanying drawings. FIG. 1 shows an overall structure of an example of a calculation system in accordance with the embodiment of the present invention. The calculation system of the present embodiment includes a server (101) owned by a credit company, a card processing device (111) connected to the server (101) located at a credit card member store and a credit card (115) owned by a customer.

The server stores a credit information service, memory count service, and customer extraction programs (104) which bear settlement functions and memory utilization, as well as a count area set-up service program (102), and a customer extraction condition set-up service program (103). The term "service program" above means a server program corresponding to a client program, or a special program that executes processes by other programs' requests. These programs are run by referring and renewing a group of tables such as a use detail table (105), credit account information table (106), count area address control table (107), count-up condition table (108), and customer extraction condition table (109).

The card processing device (111) is equipped with a display device (114). Also, the card processing device (111) is equipped with a transaction execution and memory count program (112) which runs transactions using credit cards and inputs data into the memory area of the credit card, as well as a count reading program (113) to read count information stored in the memory area of the credit card. A memory device (116) in the credit card has a credit information area (117) which stores information that identifies the card holder as well as a count area (118) which stores numerical information. The count area can be expanded within its memory capacity.

The following illustrates functions and roles of each of these components and how memories are utilized.

First, we will explain on how information is managed within a server of a credit card company with table examples.

Figure 2:
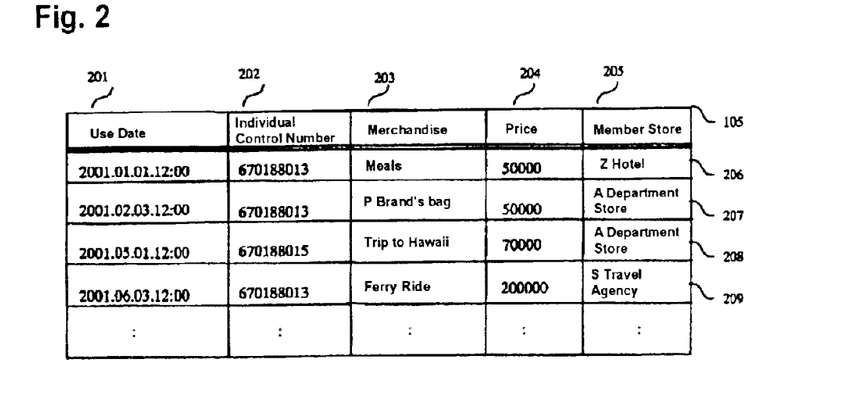
FIG. 2 shows the contents of a use detail table located in a server of credit card companies.

The use detail table in FIG. 2 shows the results of running credit card transactions.

Data examples in FIG. 2 illustrate four transactions. A use detail record located at the top indicates that the customer identified with the credit number 6470188013 had meals at a member hotel Z on Jan. 1, 2001 at twelve noon and paid 50,000 yen for the meals or a part of the meals using his credit card.

Although this illustration does not indicate how credit settlements are performed, generally, outstanding credit balances are settled through automatic withdrawals from the customer's bank account or other means of payment including money remittance by the customer with certain time intervals (i.e., once a month).

A use detail table logically consists of many fields (i.e., customer attribute, use date, store attribute, product attribute, monetary amount). Information that is used by operators for customer analyses is stored in the fields such as age group of customer, customer purchase date, store location, and merchandise brand.

In addition to regular settlement transactions, when purchases are made in accordance with the conditions designated for items in this field by operators, recording the total number of applicable purchases per customer (count-up) enables the extraction of customers who should be analyzed for their purchasing behaviors.

Figure 3:
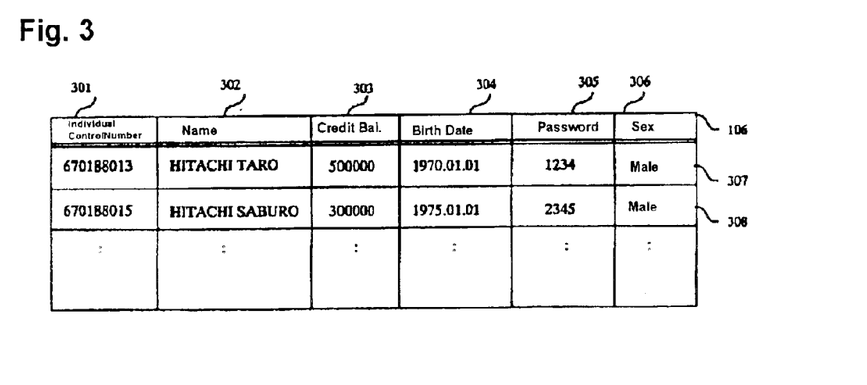
FIG. 3 shows the contents of a credit account information table located in a server of credit card companies.

FIG. 3 shows a credit account information table that manages information pertinent to customers identified by the customer control number (i.e., credit card account number). The example in the figure illustrates two customers. The customer identified by the credit number 670188013 has the name "Hitachi Taro" and is a male born on Jan. 1, 1970. Furthermore, this customer is currently allowed to make credit card purchases up to 500,000 yen (credit balance field), and the identification password at the time of settlement was "1234." The credit balance decreases when customers make purchases. For instance, after this customer spends 100,000 yen, then the credit balance field shows the balance of 400,000 yen. Though not included in the illustration, the credit account information table can also manage information such as address, occupation, years of work, annual income, marital status, and purchase history. The following assumes that the information not included in the illustration is also stored in the credit account information table.

Figure 7:
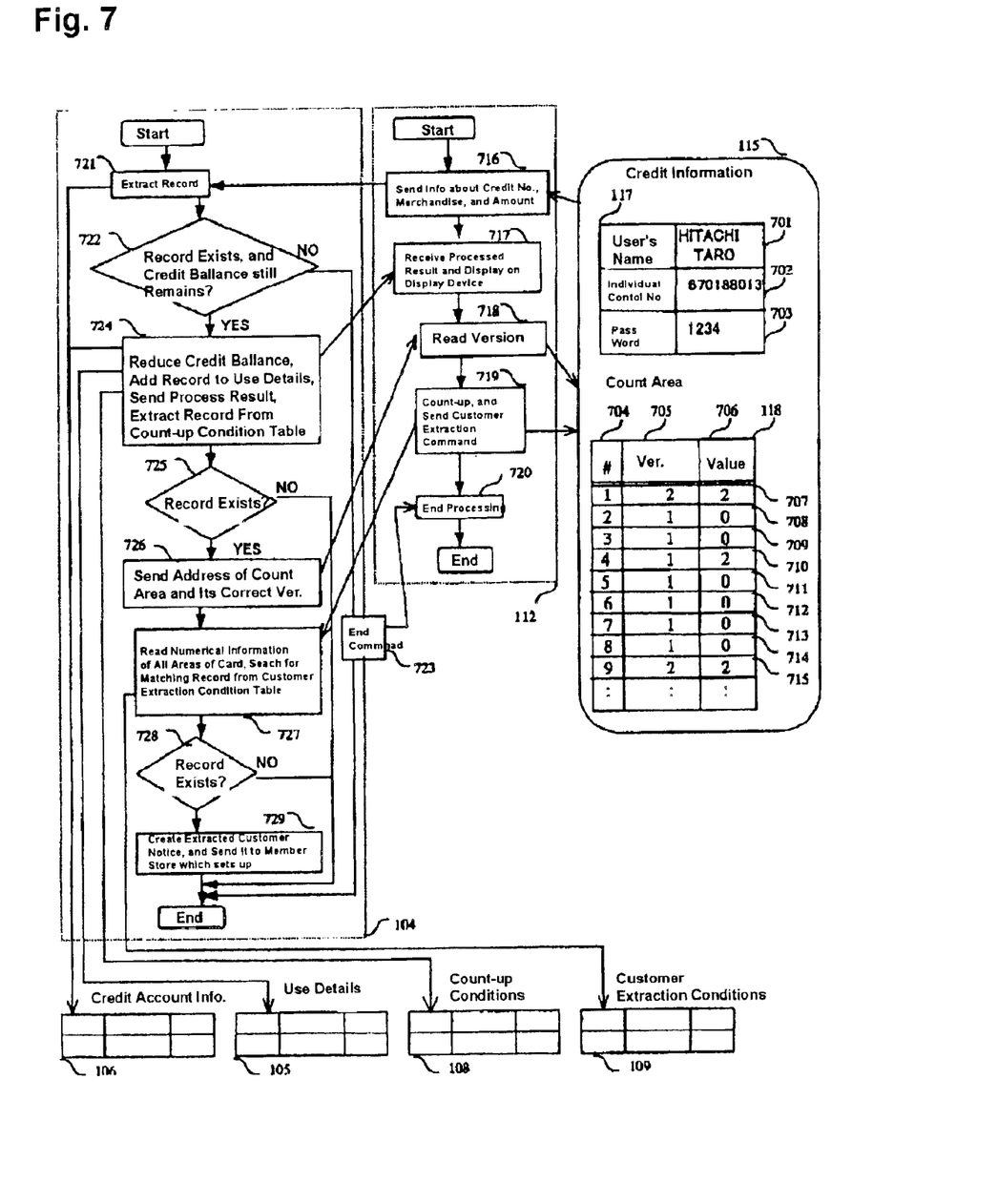
FIG. 7 shows the overall view of the transaction processing during settlements.

FIG. 7 shows on its right hand side an example of memory device allocations within a credit card. As noted earlier, the credit information area and the count area are set up in a memory device.

The credit information area records the customer name, customer control number, password used to identify the customer. In this illustration, the customer control number is used as key information to specify the customer. Name and password may be used to supplement the customer identification, which, however, will not be included in this illustration. The count area, as noted earlier, stores numerical information corresponding to the count-up conditions designated by an operator.

If these count-up conditions are renewed, the corresponding numerical information need to be cleared with "0." If memories are installed in credit cards, renewals of the numerical information on the cards may not be made at a specified set time or in conjunction with the revision of count-up conditions. As such, to allocate the same memory areas among multiple conditions for each time period, a region to record version information can be set up in each count area. One can renew the count information for each period, as noted below, by managing this version information with the programs on the server side. In such case, by matching the version information in the cards held by customers and the version information on the side that manages purchase attributes, the total number can be captured accurately even if the version is revised (if attribute items needed to be memorized have been changed).

Figure 4:
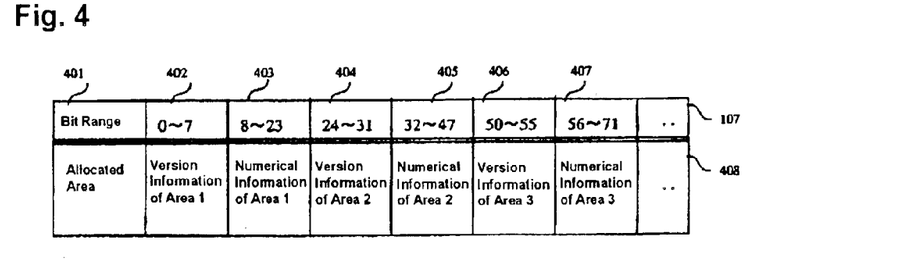
FIG. 4 shows the contents of a count area number control table located in a server of credit card companies.

A count area address table illustrated in FIG. 4 is a mapping table indicating where (in terms of how many bits apart from the start of the memory) certain area numerical values are located, and where (from what bit number to what bit number) version information is located. Without building address information in the count area itself, each program in the server can correctly maneuver the count area of the credit card slid in a card-processing device through communicating with the programs in the processing device by referring to this table.

For instance, if the version information in the area 2 of a credit card needs to be revised, the program in the server refers to this table, and determines that the version information ranging from the 24th bit to 31st bit in the card memory should be revised. Such information is then communicated to the card-processing device, in which the credit card is inserted.

The following illustrates the programs processing in a server in accordance with the present invention, and the tables set up by these programs. The count area set-up service program (102) and the customer extraction condition set-up service program (103) are in the server which sets up records for a count-up condition table and a customer extraction condition table based on conditions designated by operators. (Details will be further discussed.) If the operators are credit card member stores, the count area set-up service program (102) can also renew the contents of the count reading program in the member stores' card-processing devices.

Figure 5:
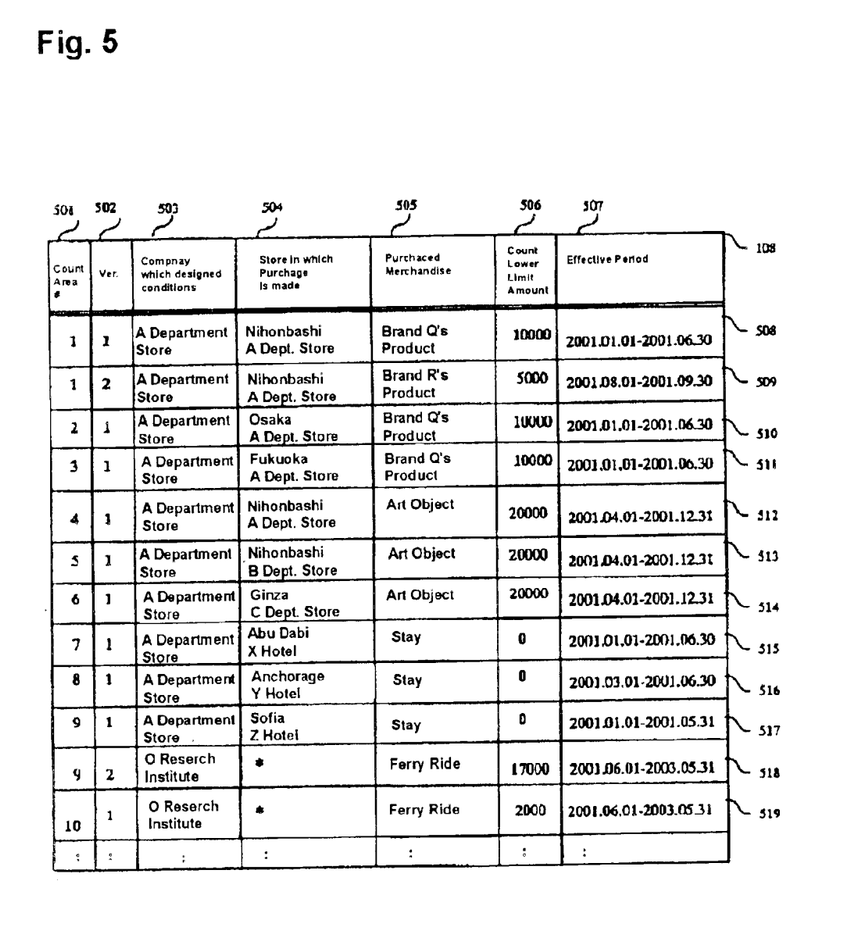
FIG. 5 shows the contents of a count-up condition table located in a server of credit card companies.

The count-up condition table in FIG. 5 shows count-up conditions designated by the operators, information indicating the allocated areas corresponding to these count-up conditions, information indicating versions of the numerical values stored in those areas, and effective periods of the versions.

There are 10 areas shown in FIG. 5. Area 1 to Area 8 are allocated to the Nihonbashi A Department Store regardless of the version, the version 1 of Area 9 is allocated to the Nishonbashi A Department Store, the version 2 of Area 9 and the version 1 of Area 10 are allocated to the O Research Institute. For instance, if a customer purchased 100,000 yen or more of brand Q's products at the A Department Store between January 1 and Jun. 30, 2001, the server of the credit card company recognizes that the transactions meet the count-up conditions corresponding to Area 1, and counts up the applicable numerical value by 1 after confirming the version of the numerical information, stored in Area 1 of the memory of this customer (stored in the count area of the card held by the customer if the memory is in the card, or in the customer record of the memory area if the memory is in the server) is 1.

Similarly, if a customer purchased 5,000 yen or more of brand R's products between August 1 and Sep. 30, 2001 at the Nihonbashi A Department Store, the server counts up by 1 after confirming the version of numerical information, stored in Area 1 of the memory of this customer, is 2.

In this case, when the version of the numerical information, stored in the count area of the credit card of the customer, is not current (if the version of the numerical information stored in the applicable count area of the customer's credit card is 1 although transactions meet the count-up conditions for the version 2 in certain areas shown in FIG. 5), the memory count program in the member stores' card-processing device renews the version and counts up after "0" clearing the numerical value, therefore renews the numerical information in the areas correctly for each period.

Likewise, the version 1 of the count area 2 and 3 will be counted for customers who purchased 100,000 yen or more of brand Q's products at the Osaka A Department Store and the Fukuoka A Department Store, respectively, between January and June, 2001. The version 1 of the count area 4, 5, and 6 will be counted for customers who purchased 20,000 yen or more of art objects at the Nihonbashi A, Nihonbashi B, and Ginza C Department Stores, respectively, between April and December, 2001. The version 1 of the count area 7, 8, and 9 will be counted, regardless of the amount, for customers who used credit cards for their stay at the Abu Dabi Hotel, Anchorage Hotel, and Sofia Hotel, respectively. The effective period, however, varies from January through June, March through June, to January through May of 2001, respectively. The version 2 of the count area 9 will be counted if, at any of member stores, 17,000 yen or more of ferry tickets are purchased between Jun. 1, 2000 (right after the effective period of the version 1 expires) and May 31, 2003, based on the request submitted by the O Research Institute.

The count-up conditions above are set up for "transactions over a predetermine amount, predetermined place (store) and predetermined period." These conditions, however, can be set up for a product category (i.e., shoes, clothes, accessories, and accommodations) or for a geographical location (i.e., overseas, so-and-so prefecture, member stores in so-and-so prefecture).

Figure 6:
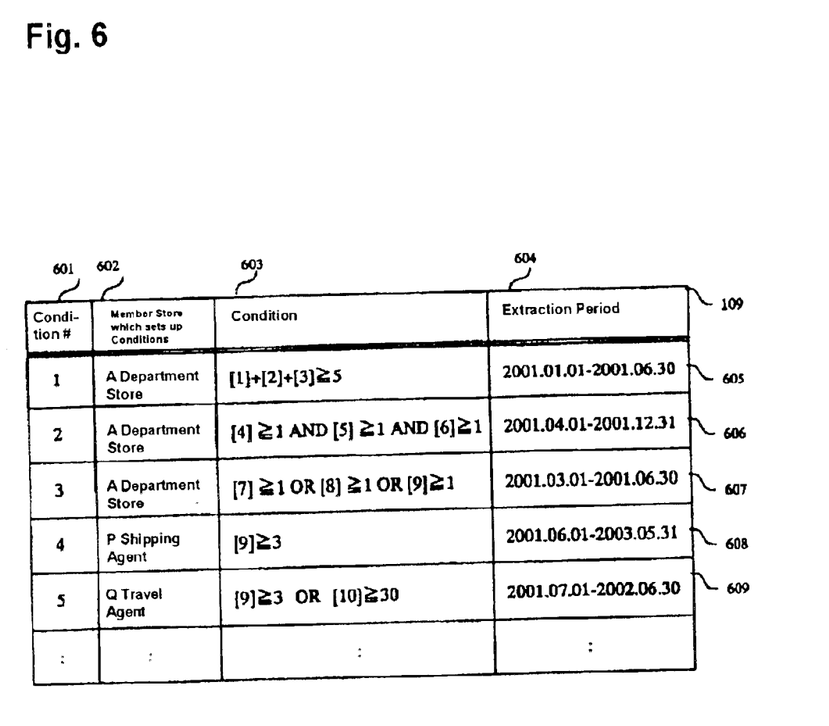
FIG. 6 shows the contents of a customer extraction condition table located in a server of credit card companies.

FIG. 6 illustrates the data structure of the customer extraction condition table. The customer extraction condition table is a standard used to specify customer information subject to analyses, and shows to which member stores a credit card company should inform based on the numerical information contained in certain areas.

For instance, the condition 1 is designated by A Department Store, and under this condition, if any customer has the sum of his numerical information (count number) is 5 or greater, in other words, for example, if he has purchased 10,000 yen or more of brand Q's products at the Nihonbashi, Osaka and Fukuoka A Department Store 5 times or more between Jan. 1 and Jun. 30, 2001, such information will be communicated to the A Department Store.

A condition managed as the condition 2 is also designated by the A department, and under this condition, information will be sent on customers who purchased 20,000 yen or more of art objects once or more at each of the Nihonbashi A, Nihonbashi B, and Ginza C Department Stores between April and December 2001.

The condition 3 is requested by the A Department Store, and information will be sent on any customer who stayed at the Abu Dabi X Hotel, Anchorage Y Hotel or Sofia Z Hotel between March and June 2001. The condition 4 is requested by the P Shipping Agent, and information will be sent on customers who purchased tickets exceeding 17,000 yen 3 times or more at any of the member stores between June 2001 and May 2003. The condition 5 is requested by the Q Travel Agency, and information will be sent on customers who purchased tickets exceeding 17,000 yen 3 times or more at any of the member stores, or customers who purchased ferry tickets exceeding 2,000 yen 30 times or more between July 2001 and June 2002.

The count areas that the conditions 4 and 5 refer to are owned by the O Research Institute by paying set-up fees to the credit card company, thus a part of the fees the P Shipline and the Q Travel Agency pay to the credit card company will be reimbursed to the O Research Institute. By doing so, member stores requesting conditions do not have to pay for fees to define count areas by themselves, and companies that defined count areas can generate income from secondary uses. Credit card companies can also generate more derivative income from limited areas.

Preparations for settlement are completed in such order. The following illustrates the processes during settlements.

During settlements, as shown in FIG. 7, transaction execution, memory count programs (in a card processing device) and credit information service, memory count service, customer extraction programs (in a server) jointly perform the processing.

A chain of settlement processing commences when a store clerk inputs information about the purchased merchandise and the price thereof into a card-processing device and slides a credit card held by the customer. The transaction execution program reads a credit card number in the credit information stored on the credit card inserted in the card-processing device, and sends the credit card number, the information about the purchased merchandise and the price to the credit information service program (716).

The credit information service program, when receiving the information sent from the transaction execution program, confirms if the purchased amount is within the credit limit by checking the settlement account information table (722), reduces the credit limit and stores the same, and makes an addition to the use details (724). If an account corresponding to the customer control number do not exist or the credit limit is exceeded, the program recognizes such a situation as being abnormal, and performs no further processing and returns the process to the transaction execution program. An ordinary settlement ends here.

Then, the transaction execution program recalls the memory count service program. The memory count service program determines is any of the conditions registered in the count-up condition table matches the customer's purchase behavior (725), and if they match, the memory count service program recalls the memory count program by communicating with the card-processing device of the member store (726).

The memory count program renews count areas in the count memory designated by the memory count service program. As noted earlier, if conditions allocated in certain count areas are separated by a time period, it performs appropriate renewals along the timeline. For instance, let's assume that a settlement for ferry ticket purchase of 5,000 yen or more was made at S Travel Agency between June 2001 and May 2003. In this case, the memory service program determines that this purchase behavior matches the condition allocated to the version 2 of the count area 9, and it recalls the memory count program and renews the count area 9. If this customer purchased ferry tickets for the first time, the versions of applicable areas stay at 1, leaving the possibility that the count related to the stay at the Sofia Z Hotel may not be cleared. Therefore, the memory count program renews numerical values in the area 9 by counting "1" (back to 0 and count up by 1) with the correct version "2."

The customer extraction program is executed after the completion of actions by the memory count program (if the memory count program is executed), and determines if any of the customer extraction conditions is satisfied in the renewed count areas (728). By this determination, when a certain extraction condition is determined to be satisfied, a customer extraction notice as shown in FIG. 8 will be sent to the subject member store.

Figure 8:
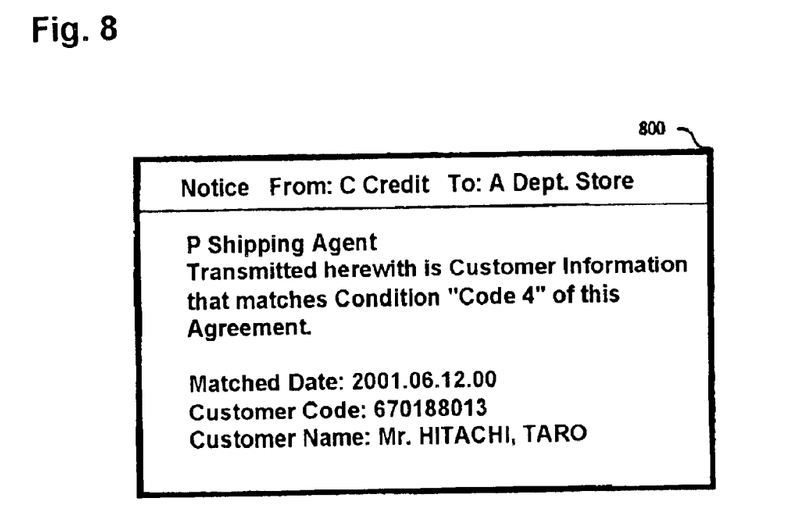
FIG. 8 shows an example of a customer extraction notice sent to member stores from servers of credit card companies.

In FIG. 8, the customer extraction notice includes the customer name, however, it can be set up not to include customer's specific information such as names and telephone numbers, and only with customer attributes (gender, age, occupation, income, purchase history).

In such case, the operator can accumulate information shown in the customer extraction notice, and analyzes the purchase trends among customers by using this accumulated information. Alternatively, the credit card company can analyze extracted customer information and send the results to the operator.

A count read program (113) is located in the card processing device, the count read program can read numerical information in the count areas without communicating with the server. Each member store which rents count memories can display on a display device how many counts any customer has (for the requested count-up conditions) at a given moment by sliding the customer's card and running the count read program.

As mentioned above, when a store requests new or revised count-up conditions and receives the allocation of count-up conditions (into the count areas of the card), the program performs a renewal after communicating with the count area service program and stores the allocation of counts (what conditions the counts are corresponding to) and the address of the counts in the memory on the card.

By the count read program, purchase information about the customers of a store can be looked at, and used for management, independently of the server. This is one of the advantages attained when memories are disposed in individual cards.

The embodiment of the present invention so far described is based on having an independent memory in a card and a program maneuvering the memory in a server. The location of a memory and programs, however, can be in a card, a server or a card-processing device at member stores.

For example, by having a program or a count area in a server, not a card, one can benefit from substantially mitigating area restrictions due to memory capacity.

Figure 9:
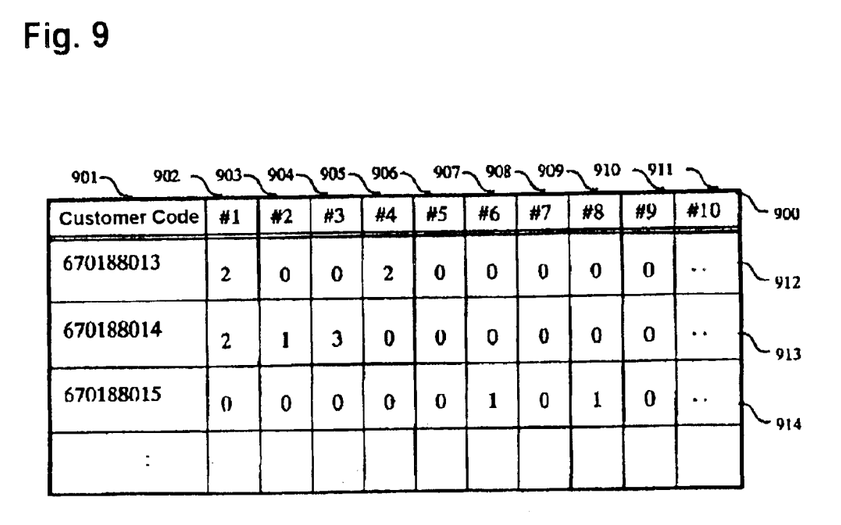
FIG. 9 shows an example of table structures when memory areas are set up in a server of credit companies.

Also, FIG. 9 illustrates allocations to each count condition when a memory area is located in a server or a card-processing device. In this case, one does not need to attach version information (which is necessary if a memory area is located in a card) as the memory area is directly connected to a central processing unit of the system, which enables timely renewals of area numerical values over the effective period. This is one of the advantages of not having memories in individual cards.

Having a memory in a card-processing device, in particular, enables the member stores to manage count information with programs of another system, which is not the case for having a memory in a server.

For programs, illustrations have been based on having a program in a server. Having a program in a card-processing device, however, enables IT staffs at member stores to renew the contents at any time and to manage information independently. Having a program in a card enables them to install different programs for regular cards and cards of valued customers and to differentiate. If both memory and program are in a card, in particular, a card itself will have further usage in addition to the customer information management by the member stores. For instance, customers will be able to exchange their counts using designated terminals.

A second embodiment of the present invention will be described below.

In this embodiment, as in the first embodiment, it is assumed that credit cards are the mean of settlements. The second embodiment is different where a program for managing a memory area in a card is set up in a card-processing device at member stores, not in a server of credit card companies. Also, in this embodiment, processing into a count area is not limited to count-up, but includes writing character strings (hereafter the area called a "member store area" corresponds to "count area" in the first embodiment).

Figure 10:
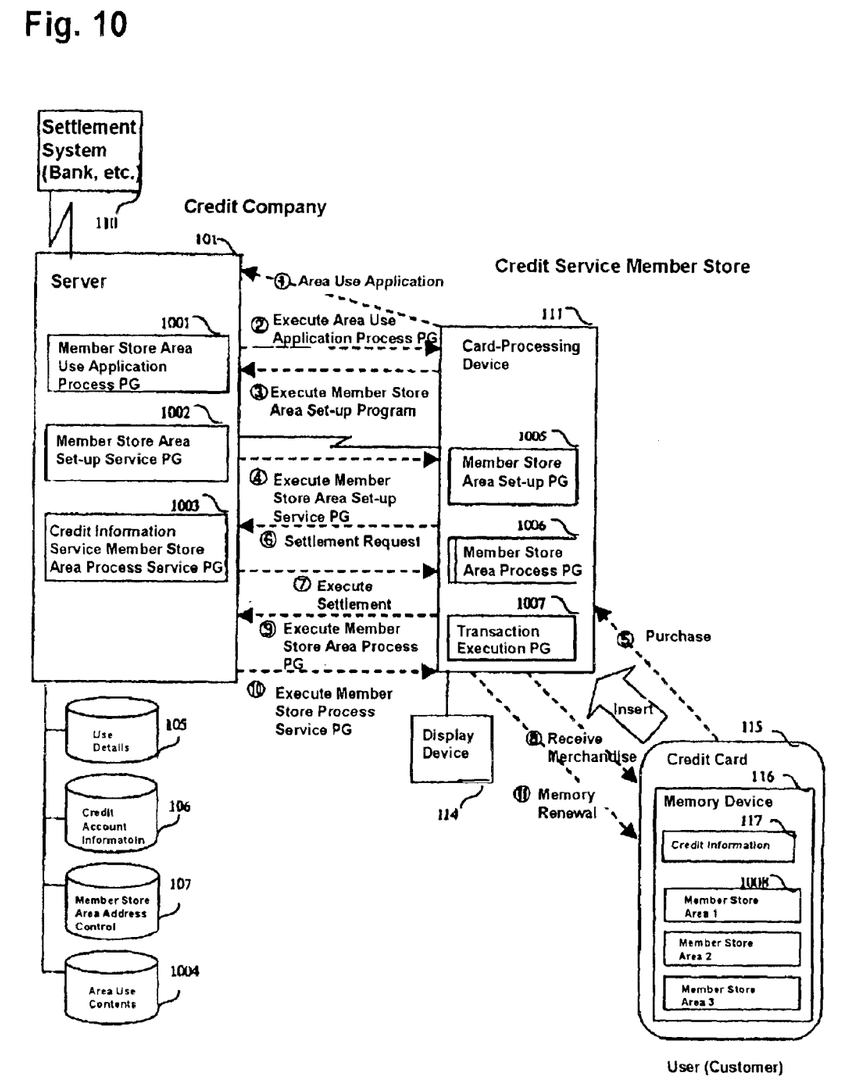
FIG. 10 shows the overall structure when memories are set up in a card and programs controlling memory areas are set up in a card-processing device.

FIG. 10 illustrates the overall structure of the system. Unlike the first embodiment, a member store area program, which processes memory areas allocated to each member store, is located in a card-processing device (1006) and coexists with a transaction execution program (1007). Also, a member store area set-up program, which sets up the contents of processing into member store areas, is located in the card-processing device as well.

In a server of a credit card company, there are a member store area use request process program (1001), which determines the allocation of areas in a card to member stores, and a member store area set-up service program (1002) and area use content table (1004), which receive program source codes for controlling areas from the member store, sends execution files after compilations, and manages their contents.

A credit card company receives an area use request from a member store (as in the first embodiment, requests from businesses other than member stores can be accepted, which, however, won't be described here), and registers the member store into a member store area address management table by activating a member store area use request process program. This mechanism is the same as the first embodiment.

Figure 11:
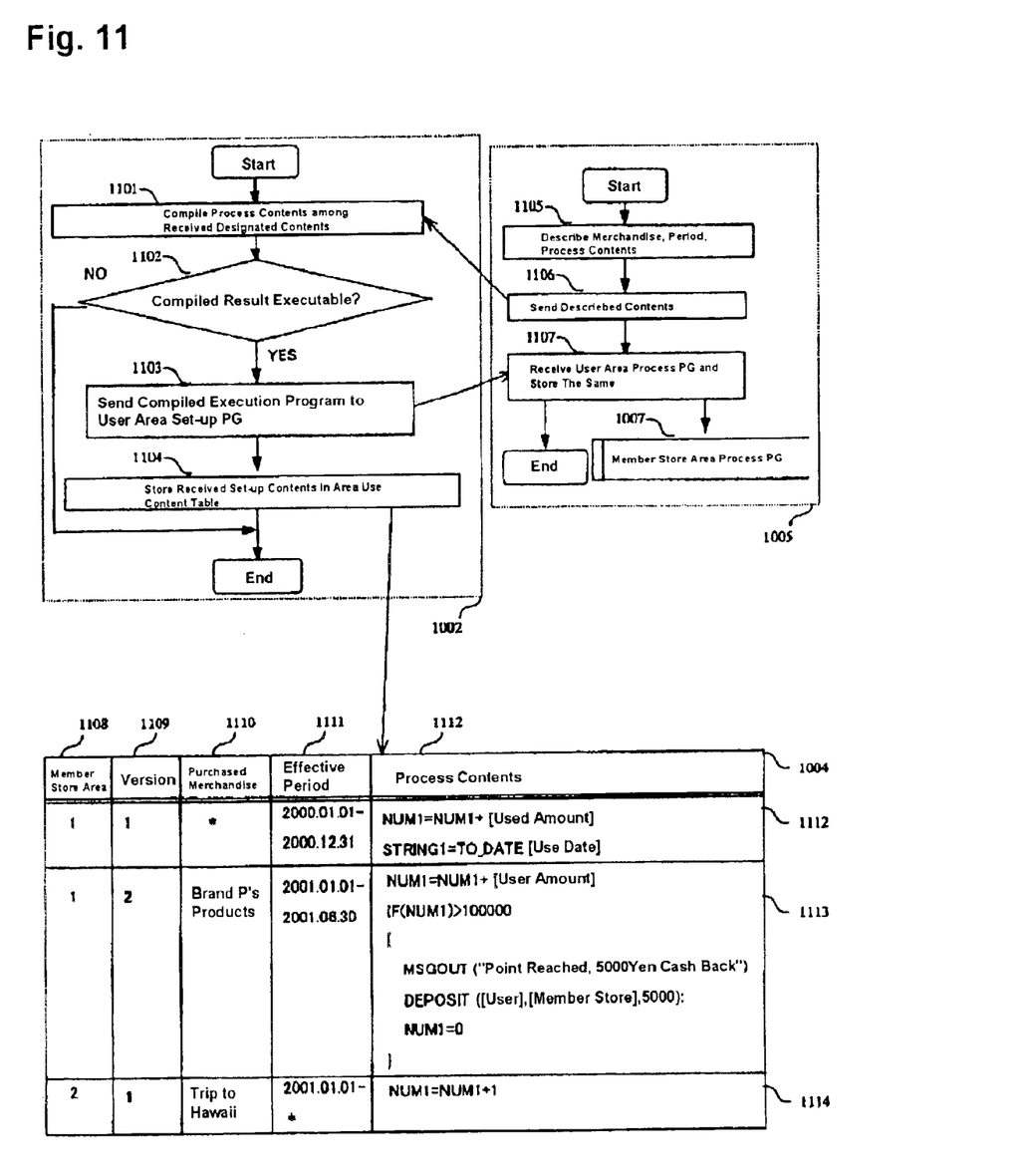
FIG. 11 shows the overall view of transactions when the programs are set up under the structure shown in the FIG. 10.

FIG. 11 shows a process flow when a credit card company receives a program for area use contents from a member store who already had areas allocated, and returns an execution file of the resultant compilation.

First, a staff at a member store activates the member store area set-up program, inputs descriptions of processes within a predetermined range of transactions, which he wants to perform for the card customer present at the store (1105), and transmits them (1106). In this embodiment, as shown in the upper right section of FIG. 12, a member store area in the card is divided into three components storing counts and three components storing character strings.

If a member store staff, for example, inputs a description of "NUM1=100; NUM1=NUM1+1," then an execution file which is compiled form these source codes can set up the first count of numerical value area at 100 first, and then at 101. Similarly, one can set up character strings in the character string areas and store them there.

A member store area set-up a service program, when it receives input source codes, compiles the codes (1101), determines if they can be executed (1102), returns an execution file that has been complied (1103), and stores the set-ups in an area use detail table (1104). The member store area set-up program receives the execution file and stores the execution file in a process device (1107) and keeps it in a state available for retrieval (1107).

FIG. 11 shows three examples to execute the area use detail table. In the first example, the table is executed when sales of all merchandises (shown as "*") are settled, and is executed for one year between Jan. 1, 2000 and Dec. 31, 2001, for the member store area 1 (version 1) of cards presented by customers, in a card-processing device at the member store which requested. For example, as indicated the figure, the table stores, at NUM1 in the area 1 (version 2), the total amount of purchases settled at the A Department Store, and stores, at STRING 1 area, the last date when this customer made purchases at this member store. In the second example, the table stores the total amount of purchases at NUM1 of the area 1 (version 2) only when purchases for the Company P's products are made at this member store, and if the total amount exceeds 100,000 yen, then it will display "points reached, 5,000 yen cash back" on the display device of the card-processing device. Also, 5,000 yen will be transferred from a bank account of the member store to the customer's bank account. In this case, the criterion to determine if the transaction is in the specified range indicated above is whether or not purchases are for Company's P products.

In this example, a point reimbursement service to a valued customer is done by transferring money from the member store to the customer.

Figure 12:
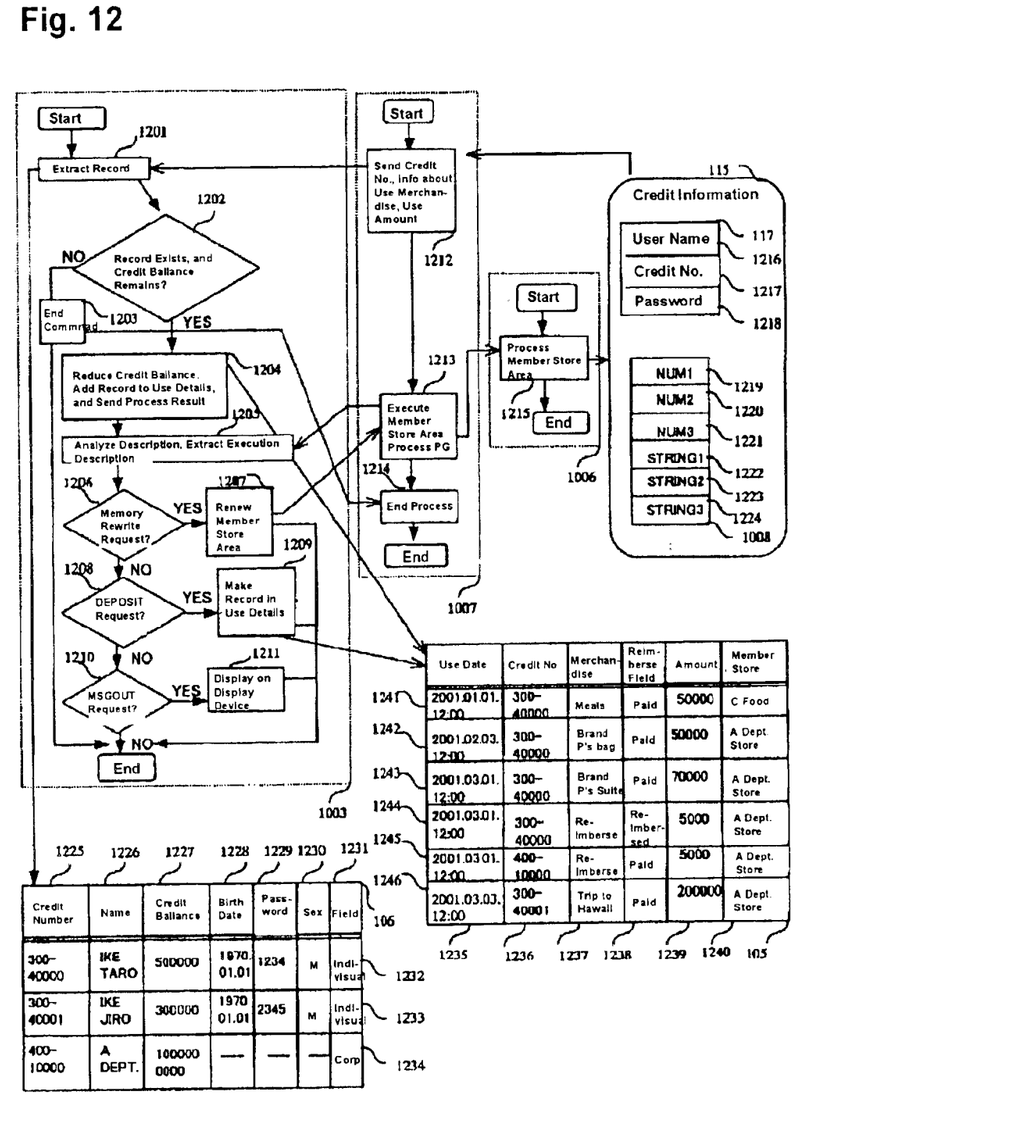
FIG. 12 shows the overall view of transactions when settlements are carried out under the structure shown in the FIG. 10.

As shown in FIG. 12 at the bottom right section and bottom left section, a use detail table and a credit account information table. The use detail table has a reimbursement type field (1238), and if this field shows "Reimburse", it means that the money is sent to the customer's bank account.

If the member store paying the cash back is the A Department Store and the customer's name receiving the cash back is Taro Ike, as shown in the figure, in the credit account information table, the bank account of this customer (1232) and the bank account of the A Department Store (1234) are managed as an individual and as a corporate, respectively, and that the total purchase amount is accumulated by 4 records (1242–1245) in the use detail table and cash backs are made.

The third example is activated for any unspecified period after January 2002 (shown as "–*" in FIG. 11), and the total number of purchases will be stored at NUM1 in the area 2 (version 1) if trips to Hawaii are purchased at the member store. Though not illustrated, if a transaction range is set up by purchased merchandises, a credit company's server will manage by classifying each of merchandises and giving codes thereto, thus setting up conditions using purchased merchandises will become easier.

In this case, the member store area 2 is not necessarily a use area allocated to the same member store as the area 1. In other words, an execution file that is created with descriptions provided by a certain member store and retained in a card-processing device at this member store can process for areas of other member stores. This business is based on the mechanism similar to earning fees from secondary uses of the defined count areas illustrated in the first embodiment.

The process for setting up the area use details has been so far described with reference to FIG. 11. The process for executing settlements will be described with reference to FIG. 12.

First, a card is slid in a card-processing device, and a staff at a member store activates a transaction execution program. The staff sends information for purchased merchandises, etc., which activates a credit information service/member area processing service program, and adds records to use details (1204).

Next, the transaction execution program calls the member area processing program. Processing contents called are first sent to a credit company's server, and the descriptions of the contents are analyzed by the credit information service/member area processing service program (1205).

If the analyzed descriptions contains a memory rewrite request, a command to renew the service member area is sent to the transaction execution program (1207). Upon receiving the command, the member service area program is executed (1215), and processes for the card inserted in the card-processing device are executed. If the analyzed descriptions contain a reimbursement (DEPOSIT) request, a record of the request is added to the use detail table, and a cash back is made from the member store to the customer (1209). Also, if the descriptions contain a message output request (MSGOUT), a command to display the message on a display device of the processing device is sent (1211).

As indicated so far, by renting independent memory areas using the structure of the present embodiment, credit card companies can operate a business to rent memory areas and programs for managing those memory areas. In addition, the member stores can utilize credit cards as membership cards.

In the first embodiment, the A Department Store, a member store, requested for renting 10 conditions (including different versions) or a total of 10 count areas. Also, the O Research Institute, not a member store, requested for renting 2 count areas. The A Department Stores requested for running a customer extraction program, and the P Shipping Agent and the Q Travel Agency, member stores, each requested for running one condition.

In the second embodiment, the A Department Store requested for 3 card processing contents (including different versions), and it may allow other member stores to use the processing results.

Credit card companies can collect a specified amount of rental fees from these companies based on the number of count areas (member store areas) and customer extraction conditions or the period to rent these areas and conditions.

The above-described business is conducted according to the following procedure:

(1) Member stores or other companies request for renting memory areas, (2) A card company manages empty memory areas in servers or cards, and allocate sections in the empty memory areas to the requesting stores or companies, (3) Member stores or other companies request for conditions to operate memory areas, (4) The card company registers applicable conditions in the system so that the requested conditions will be activated after settlements are made.

(5) The card company charges these companies based on the memory capacity, period of use, number of customer extraction conditions used, etc.

The present invention enables the collection of data subject to analyses during card transactions, which are suitable to the viewpoints of customers who specify each condition by designating conditions which determine the objects based on the element customers wish to analyze.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transaction management system which processes transactions using settlement cards each containing individual control information for at least identifying a card holder, the transaction management system comprising:

a credit account information memory section that stores individual control numbers and information associated with the individual control numbers about card owners identified by the individual control numbers;

a count-up condition memory section that stores at least one count-up condition indicating a predetermined range of transaction types;

a count area that stores numerical information indicating the number of transactions meeting the count-up conditions for each of the individual control numbers;

an extraction condition memory section that stores extraction conditions each defining a conditional formula that specifies a range of numerical values;

a transaction processing section that processes each transaction using the settlement card based on the individual control number that is input at the transaction and transaction information for the transaction;

a memory count section that judges whether or not the transaction meets the count-up condition, and renews the numerical information when the transaction meets the count-up condition; and an extraction section that determines if the numerical information renewed by the memory count section is within the predetermined range indicated by the conditional formula, and extracts, when the numerical information is within the predetermined range, the individual control information corresponding to the count area storing the numerical information determined to be in the predetermined range.

2. The transaction management system according to claim 1, wherein the count-up condition section stores a plurality of count-up conditions, the memory count section stores the numerical information by each of the count-up conditions, and the memory count section determines whether or not a transaction meets each of the count-up conditions and adds a numerical value to the numerical information corresponding to the count-up conditions satisfied by the transaction if the transaction meets the count-up conditions.

3. The transaction management system according to claim 2, wherein each of the extraction conditions specifies a plurality of numerical data among the numerical information stored by each of the count-up conditions and a computation formula based on numerical values represented by the plurality of numerical data, and indicates a range of results derived from the predetermined computation formula, and the memory count section determines whether or not a computation result obtained based on the plurality of numerical data and the computation formula is within the range of the results, and the extraction section extracts the individual control information corresponding to the count areas storing the specified plurality of numerical data determined to be in the range.

4. A transaction processing method for a transaction management system which processes transactions using settlement cards each containing individual control information for at least identifying a card holder, the transaction processing method comprising the steps of:

executing a predetermined transaction process based on individual control information that is input at the transaction and transaction information for the transaction;

judging based on the transaction information whether or not the transaction satisfies at least one count-up condition indicating a predetermined range of transaction type;

when the transaction meets the at least one count-up condition, adding a numerical value to numerical information indicative of the number of transactions satisfying the at least one count-up condition by the individual control number;

determining whether or not a numerical value represented by the added numerical information is within a range specified by an extraction condition defined by a conditional formula specifying a predetermined range of numerical values; and extracting individual control information corresponding to the added numerical information determined to be within the range, and outputting card holder information corresponding to the extracted individual control information.

5. The transaction management method according to claim 4, wherein the at least one count-up condition includes a plurality of count-up conditions, the numerical information indicative of the number of transactions satisfying the count-up conditions indicates numerical information of each of the plurality of count-up conditions by the individual control number, and the judging step is conducted for each of the plurality of count-up conditions.

6. The transaction management method according to claim 5, wherein each of the extraction conditions specifies a plurality of numerical data among the numerical information of each of the plurality of count-up conditions and a specified computation formula based on the plurality of numerical data, and indicates a range of results derived from the computation formula, and the determining step makes a determination as to whether or not a computation result obtained based on the specified plurality of numerical data and the computation formula is within the range of the results.

7. The transaction management method according to claim 6, wherein each of the count-up conditions and the numerical information has version information, and the judging step compares the satisfied count-up conditions to the version information of the numerical information corresponding to the count-up conditions, and adds to the numerical information when the version information compared matches.

8. The transaction management method according to claim 7, wherein, when the compared version information does not match, the version information of the numerical information is renewed, and a numerical value representing the numerical information is set to 1.

9. The transaction management method according to claim 8, wherein a version indicated in the version information has a predetermined effective period, and the count-up conditions with versions whose effective periods have expired are invalidated.

10. A transaction processing method, comprising the steps of:

processing transactions based on individual control information inputted using a settlement card and transaction information input during a transaction;

determining whether or not the transaction matches at least one specified type of transaction and reach a specified number of transactions; and extracting information relative to the individual control information based on the determination, wherein each of the settlement card contains individual control information for at least identifying a card holder, and the step of processing transactions includes the step of executing a predetermined transaction process based on the individual control information that is input at each of the transactions and transaction information for the transaction, and wherein the determining step includes the steps of:
judging based on the transaction information whether or not the transaction satisfies at least one count-up condition indicating a predetermined range of transaction type;

when the transaction meets the at least one count-up condition, adding a numerical value to numerical information indicative of the number of transactions satisfying the at least one count-up condition by the individual control number; and determining whether or not a numerical value represented by the added numerical information is within a range specified by an extraction condition defined by a conditional formula specifying a predetermined range of numerical values.

11. The transaction processing method according to claim 10, wherein the step of extracting includes the step of extracting individual control information corresponding to the added numerical information determined to be within the range, and outputting card holder information corresponding to the extracted individual control information.

12. The transaction management method according to claim 11, wherein the at least one count-up condition includes a plurality of count-up conditions, the numerical information indicative of the number of transactions satisfying the count-up conditions indicates numerical information of each of the plurality of count-up conditions by the individual control number, and the judging step is conducted for each of the plurality of count-up conditions.

13. The transaction management method according to claim 12, wherein each of the extraction conditions specifies a plurality of numerical data among the numerical information of each of the plurality of count-up conditions and a specified computation formula based on the plurality of numerical data, and indicates a range of results derived from the computation formula, and the determining step makes a determination as to whether or not a computation result obtained based on the specified plurality of numerical data and the computation formula is within the range of the results.

14. The transaction management method according to claim 13, wherein each of the count-up conditions and the numerical information has version information, and the judging step compares the satisfied count-up conditions to the version information of the numerical information corresponding to the count-up conditions, and adds to the numerical information when the version information compared matches.

15. The transaction management method according to claim 14, wherein, when the compared version information does not match, the version information of the numerical information is renewed, and a numerical value representing the numerical information is set to 1.

16. The transaction management method according to claim 15, wherein a version indicated in the version information has a predetermined effective period, and the count-up conditions with versions whose effective periods have expired are invalidated.

* * * * *